Feb. 2, 1943.    W. P. BROWNE ET AL    2,310,063
FIELD BOX
Filed May 9, 1941    2 Sheets-Sheet 1
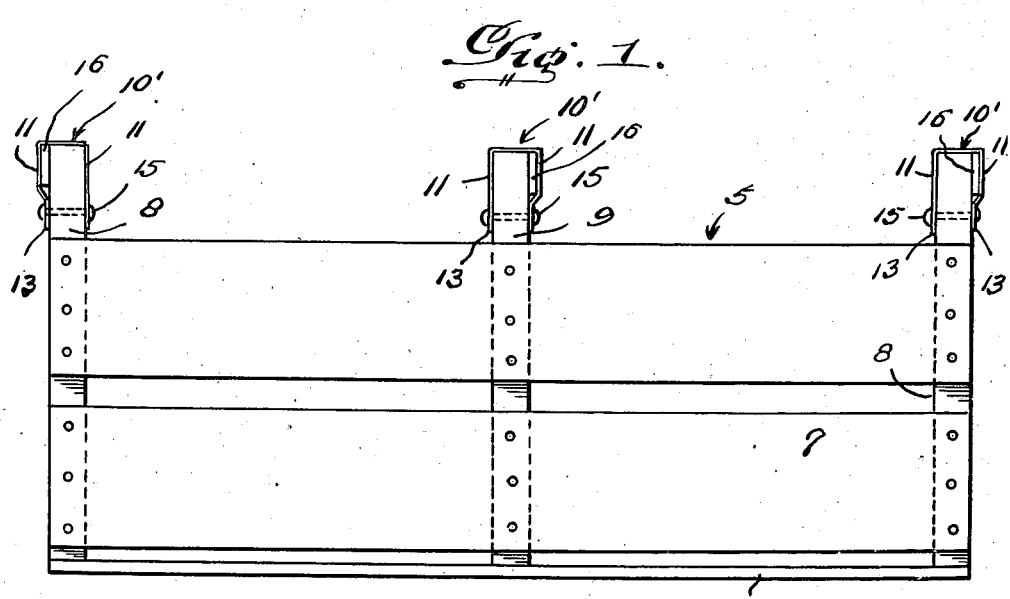
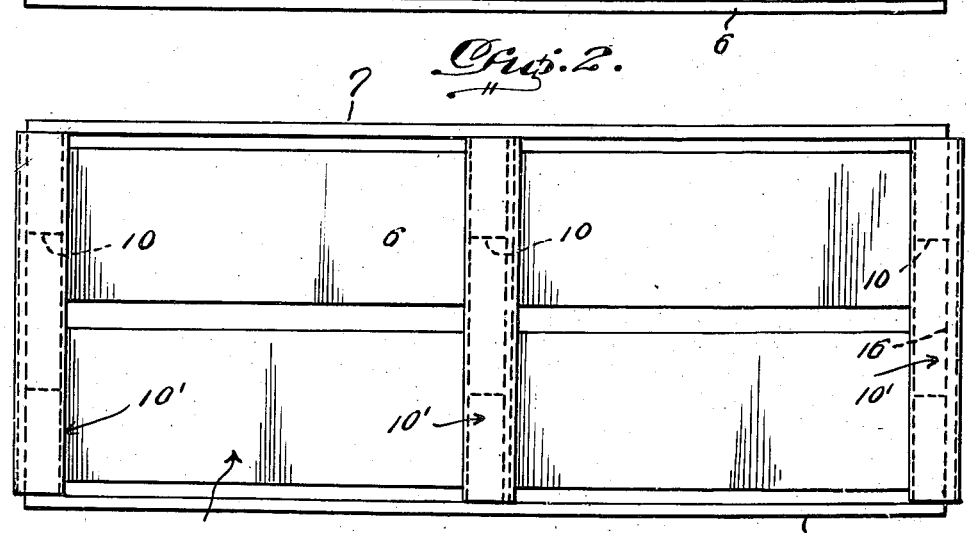
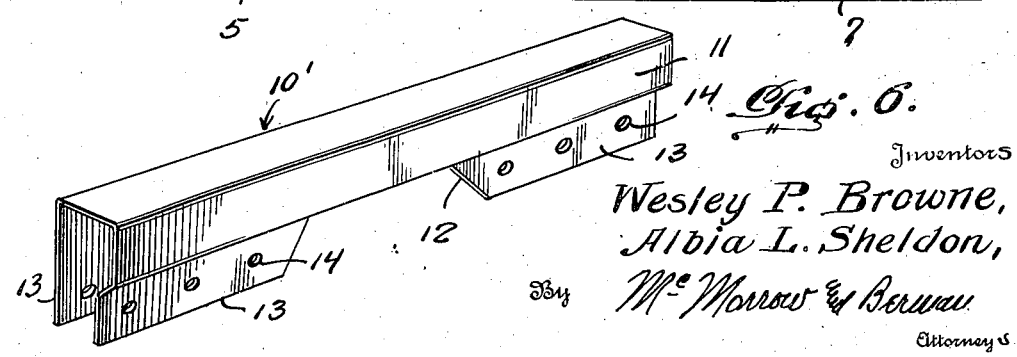
Inventors
Wesley P. Browne,
Albia L. Sheldon,
By McMorrow & Berman
Attorneys

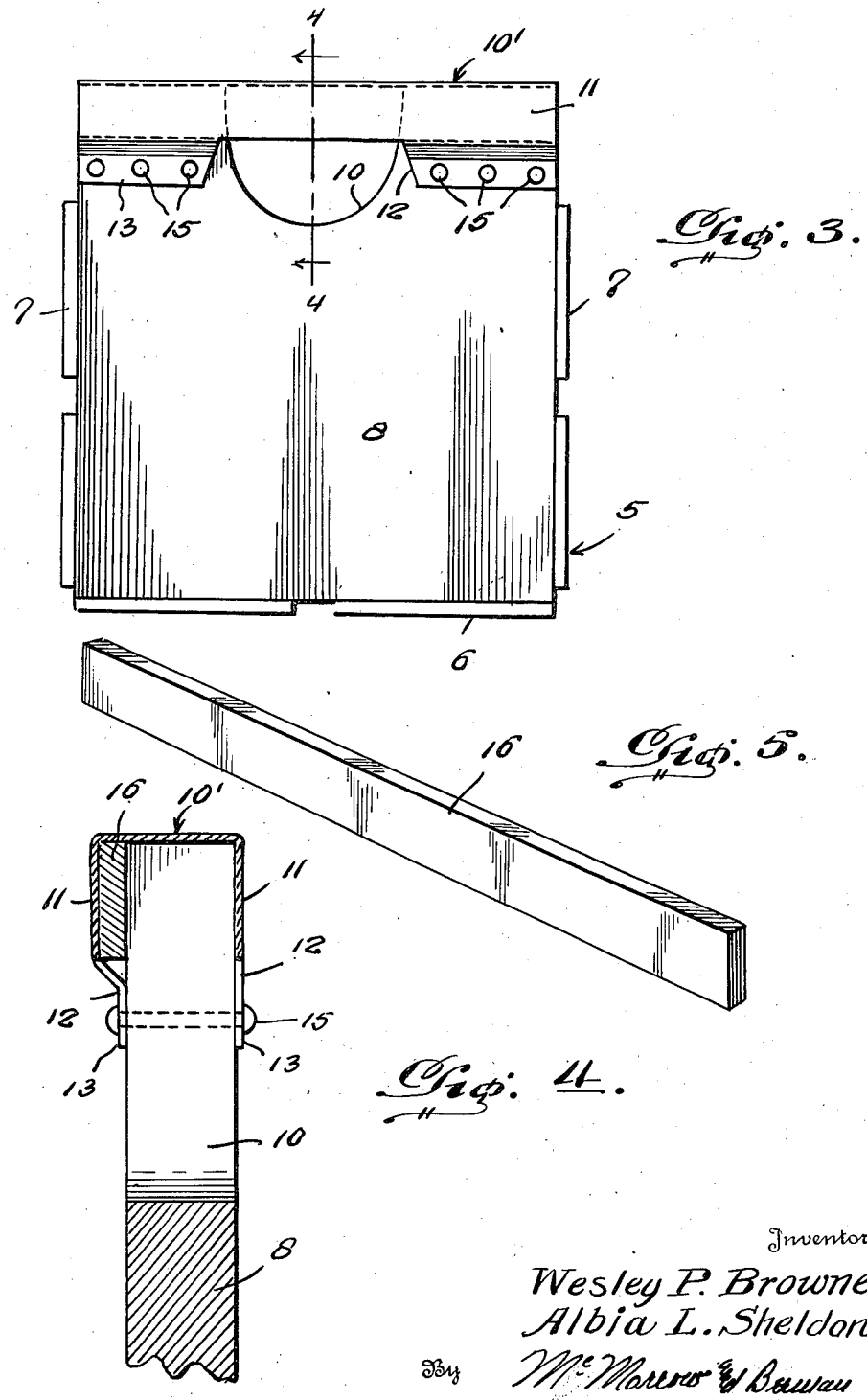

Patented Feb. 2, 1943

2,310,063

UNITED STATES PATENT OFFICE 2,310,063

FIELD BOX

Wesley P. Browne and Albia L. Sheldon, Winter Garden, Fla.

Application May 9, 1941, Serial No. 392,814

1 Claim. (Cl. 217—40)

This invention relates to field boxes employed in the gathering and carrying of citrus and other fruits and more particularly to handle constructions therefor, and has for the primary object the provision of constructions of the kind above stated which will provide efficient, durable and easily gripped handles for facilitating the lifting and carrying of the field boxes and which also acts to reinforce the box heads and partition wall thereof when applied thereto and which are to some extent weakened by the cutouts now provided for the reception of the fingers of the person engaged in the handling of said boxes.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which Figure 1 is a side elevation illustrating a field citrus box equipped with handle construction, constructed in accordance with our invention.

Figure 2 is a top plan view illustrating the same.

Figure 3 is an end elevation illustrating the device.

Figure 4 is a detail sectional view taken on the line 4—4 of Figure 3.

Figure 5 is a perspective view illustrating a reinforcement strip.

Figure 6 is a perspective view illustrating one of the handle elements.

Referring in detail to the drawings, the numeral 5 indicates a conventional type of field box employed for the gathering of citrus and other fruits, including the usual bottom 6, side walls 7 constructed of spaced slats and end walls or heads 8 which protrude a limited distance above the upper edges of the side walls 7. The box is further provided with a partition 9 constructed similarly to the end walls or heads 8 which also protrude a limited distance above the upper edges of the side walls 7.

It is customary to provide in the heads 8 and partition 9 cutouts 10 which open outwardly through the upper edges of said heads and partition for the purpose of receiving the fingers of a person when lifting the box equipped with handle members spanning the cutouts 10. The customary practice is to nail or otherwise fasten strips or members on the side faces of the heads and the partition to form the handles by spanning the cutouts. This procedure tends to weaken the heads as well as the partition and also to provide a handle construction that is not durable and may be easily broken.

To overcome these objections the present invention is adapted to the heads and the partition and will provide durable and efficient hand grips or handles for the box.

Each handle element, designated by the character 10', is constructed of channeled metallic stock adapted to straddle or fit over the upper portion of the head or partition as clearly shown in the drawings. The channeled handle or the sides thereof indicated by the character 11 are provided with cutouts 12 opening through the lower edges thereof for matching the cutout 10 of the head or partition and defining spaced flange portions 13 to the sides 11 of the handle construction. The flanges are provided with aligned openings 14 to receive bolts, rivets or like fasteners 15 which extend through the head or partition for firmly anchoring the handle construction thereon.

One of the side walls 11 has its flange portion 13 offset inwardly as shown in Figures 1 and 6 for the purpose of spacing the said side wall from a side face of the partition or head for the reception of a wooden reinforcing strip 16 which lies above the cutout 12 so as not to interfere in any way with the placing of a person's fingers through the cutouts 12 and 10. The other side 11 of the handle construction extends parallel and flush against the other side face of the partition or head.

Handle constructions of the character described in detail and shown in the drawings when adapted to the heads and partition of a box 5 will provide efficient mediums for a person to grip in lifting and carrying the box and also efficiently reinforce the upper portions of the heads and partition where such portions to some extent have been weakened by the cutouts 10.

Devices of this kind will be extremely easy to install, and will be serviceable from every standpoint and may be manufactured and sold at a low cost.

While we have shown and described the preferred embodiment of our invention, it will be understood that minor changes in construction, combination and arrangement of parts may be made without departing from the spirit and scope of the invention as claimed.

Having thus described our invention, what is claimed is:

In a handle construction for field boxes, the combination of a field box head having a cutout opening through an edge thereof, of a sheet metal handle member of channel formation provided with a length equal to the width of the head and receiving the upper portion of said head therein and spanning the cutout, said handle member including opposite side portions and a connecting portion adapted to rest flatly on said edge of the head with one of said side portions resting flatly against a side face of the head and the other side portion being bent to have a part thereof in contact with a side face of the head and a part thereof spaced from said latter-named side face of the head, said side portion of the handle member having cutouts opposite the cutout of the head to permit a person to place fingers into the cutout of the head, and a strip filling the space between one of the side portions of the handle member and the head and acting to reinforce the latter where weakened by the cutout therein and to provide a bearing surface for the person's fingers to engage when in the act of lifting the head, and means for securing the side portions of the handle member to the head.

WESLEY P. BROWNE.
ALBIA L. SHELDON.